(12) United States Patent
Klein

(10) Patent No.: US 6,279,125 B1
(45) Date of Patent: Aug. 21, 2001

(54) COMPUTER SYSTEM DIAGNOSTICS

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/103,979

(22) Filed: Jun. 24, 1998

(51) Int. Cl.$^7$ .................................................. C06F 11/00
(52) U.S. Cl. .............................. 714/38; 714/39; 714/44; 714/46
(58) Field of Search .................... 714/46, 25, 31, 714/38, 44, 3; 707/104

(56) References Cited

U.S. PATENT DOCUMENTS

| | | | | |
|---|---|---|---|---|
| 4,425,625 | * | 1/1984 | Seligman et al. | 364/900 |
| 4,879,738 | * | 11/1989 | Petro | 379/3 |
| 5,287,505 | * | 2/1994 | Calvert et al. | 395/600 |
| 5,404,503 | * | 4/1995 | Hill et al. | 395/575 |
| 5,521,958 | * | 5/1996 | Selig et al. | 379/21 |
| 5,581,600 | * | 12/1996 | Watts et al. | 379/67 |
| 5,615,331 | * | 3/1997 | Toorians et al. | 395/182.07 |
| 5,678,002 | * | 10/1997 | Fawcett et al. | 395/183.01 |
| 5,802,526 | * | 9/1998 | Fawcett et al. | 707/104 |
| 5,862,322 | * | 1/1999 | Anglin et al. | 395/185.1 |
| 5,881,135 | * | 5/1999 | Watts et al. | 379/88.02 |
| 5,983,369 | * | 11/1999 | Bakoglu et al. | 714/46 |

* cited by examiner

Primary Examiner—Norman M. Wright
(74) Attorney, Agent, or Firm—Knobbe, Martens, Olson & Bear, LLP

(57) ABSTRACT

The invention enables reporting of diagnostic data from a user's computer to a diagnostic technician or an automated diagnostic system, and may be advantageously applied to report data over a telephone connection. To facilitate diagnostic data reporting, gathering of diagnostic data is automated and the gathered data is automatically reported using a generated audio signal. Automated reporting using a generated audio signal may be helpful in reducing human errors in the reporting of diagnostic data to remote technicians.

19 Claims, 5 Drawing Sheets

410

| APPLICATION ||||| 
|---|---|---|---|---|
| APPLICATION | VENDOR | VERSION | PARAMETER | DATA TYPE |
| (ALL) | – | | MEMORY | INTEGER |
| (ALL) | – | | DISK SPACE | INTEGER |
| (ALL) | – | | INSTALLATION LOCATION | STRING |
| ULTRA WORDS | VENDOR A | (ALL) | PRINTER PORT | INTEGER |
| ULTRA WORDS | – | (ALL) | PRINTER TYPE | STRING |
| ULTRA WORDS | VENDOR A | 4 | PRINTER RESOLUTION | INTEGER |
| ULTRA WORDS | VENDOR B | 2 | NETWORK CONNECTION | STRING |
| INTERNET PRO | VENDOR A | 5 | NETWORK CONNECTION | STRING |
| INTERNET PRO | VENDOR A | 5 | MODEM TYPE | STRING |
| INTERNET PRO | VENDOR B | 5 | NETWORK CARD TYPE | STRING |
| DRAWME | VENDOR D | (ALL) | MOUSE | STRING |
| DRAWME | VENDOR D | (ALL) | DISPLAY TYPE | STRING |
| DRAWME | VENDOR D | (ALL) | DISPLAY RESOLUTION | INTEGER |

420

| HARDWARE ||
|---|---|
| HARDWARE | PARAMETER |
| PRINTER PORT | INTERRUPT |
| PRINTER PORT | I/O ADDRESS |
| VIDEO CARD | RESOLUTION |
| VIDEO CARD | MEMORY |
| VIDEO CARD | COLORS SUPPORTED |
| MOUSE | PORT |

APPLICATION

| APPLICATION | VENDOR | VERSION | PARAMETER | DATA TYPE |
|---|---|---|---|---|
| (ALL) | — | | MEMORY | INTEGER |
| (ALL) | — | | DISK SPACE | INTEGER |
| (ALL) | — | | INSTALLATION LOCATION | STRING |
| ULTRA WORDS | VENDOR A | (ALL) | PRINTER PORT | INTEGER |
| ULTRA WORDS | — | (ALL) | PRINTER TYPE | STRING |
| ULTRA WORDS | VENDOR A | 4 | PRINTER RESOLUTION | INTEGER |
| ULTRA WORDS | VENDOR B | 2 | NETWORK CONNECTION | STRING |
| INTERNET PRO | VENDOR A | 5 | NETWORK CONNECTION | STRING |
| INTERNET PRO | VENDOR A | 5 | MODEM TYPE | STRING |
| INTERNET PRO | VENDOR B | 5 | NETWORK CARD TYPE | STRING |
| DRAWME | VENDOR D | (ALL) | MOUSE | STRING |
| DRAWME | VENDOR D | (ALL) | DISPLAY TYPE | STRING |
| DRAWME | VENDOR D | (ALL) | DISPLAY RESOLUTION | INTEGER |

HARDWARE

| HARDWARE | PARAMETER |
|---|---|
| PRINTER PORT | INTERRUPT |
| PRINTER PORT | I/O ADDRESS |
| VIDEO CARD | RESOLUTION |
| VIDEO CARD | MEMORY |
| VIDEO CARD | COLORS SUPPORTED |
| MOUSE | PORT |

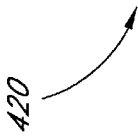

Fig. 4

| CHARACTER IN STRING | PRONOUNCED WORD |
| --- | --- |
| A | ALPHA |
| B | BRAVO |
| C | CHARLIE |
| D | DELTA |
| E | ECHO |
| F | FOXTROT |
| G | GOLF |
| H | HOTEL |
| I | INDIA |
| J | JULIET |
| K | KILO |
| L | LIMA |
| M | MIKE |
| N | NOVEMBER |
| O | OSCAR |
| P | PAPA |
| Q | QUEBEC |
| R | ROMEO |
| S | SIERRA |
| T | TANGO |
| U | UNIFORM |
| V | VICTOR |
| W | WHISKEY |
| X | XRAY |
| Y | YANKEE |
| Z | ZULU |

*Fig. 5*

COMPUTER SYSTEM DIAGNOSTICS

BACKGROUND INFORMATION

Personal computers are complex electronic devices that are often purchased and used by individuals who have limited knowledge of their operation. When a personal computer user attempts to configure the computer for use with new hardware or software, many problems may arise causing the computer system to malfunction. When such problems arise, the computer user may not have the knowledge or equipment necessary to diagnose and fix the problem.

When computer configuration problems arise or when malfunctions occur, the user may rely on telephone assistance from a computer technician. In order to fix the problem, the technician require various items of computer configuration data. To get the required information, the technician may have to rely on an inexperienced user to locate the data items and properly disclose them. This may require complex examination of configuration parameters and databases at the malfunctioning computer. Even with guidance from the repair technician, this process is difficult for the inexperienced user and is error prone. Consequently, improved methods of reporting computer configuration data are desired.

SUMMARY

The invention enables reporting of diagnostic data from a user's computer to a diagnostic technician or an automated diagnostic system, and may be advantageously applied to report data over a telephone connection. To facilitate diagnostic data reporting, gathering of diagnostic data is automated and the gathered data is automatically reported using a generated audio signal. Automated reporting using a generated audio signal may be helpful in reducing human errors in the reporting of diagnostic data to remote technicians.

In general, in one aspect, the invention features a software-implemented method of reporting computer system diagnostic information. The method includes receiving a report specification and generating an audio signal representation of report data. The report specification identifies one or more computer system parameters. The output report data can be generated by searching a configuration database for information associated with the identified computer system parameters. The located information may subsequently be converted to an audio signal by an audio output device.

Implementations of the invention may include one or more of the following features. The report specification may be received by selecting parameters using a graphical user interface or may be received by querying an operating system for fault information. Searching the configuration database may include searching both application program and operating system configuration files. The generated audio signal may be a telephone compatible voice-bandwidth signal and may include speech generated by a text-to-speech converter. Report data may be altered using a phonetic alphabet representation and/or may be converted to dual tone multi-frequency (DTMF) tones by the audio device.

In general, in another aspect, the invention features a computer system configured to report diagnostic data. The system includes a processor configured to determine a report parameter, to locate data associated with the report parameter in a system configuration database, and to convert the located data to an audio signal.

Implementations of the invention may include one or more of the following features. The invention may include an operating system program controlling the allocation of computer system physical resources and storage of resource allocation information in a configuration database. The system may include multiple configurable hardware components and may include a configuration database having data associated with the multiple configurable hardware components.

In general, in another aspect, the invention features a computer system including an audio output device, a computer program residing on a storage media, and a system configuration database residing on a storage media. The system has a processor that can execute the stored computer program. The computer program includes instructions for causing the computer to receive a report specification, locate data associated with computer system parameter identification information, produce report information from the located data, and generate an audio signal representative of the report data In general, in another aspect, the invention features a computer program residing on a computer-readable medium. The program includes instructions for causing a computer to receive a report specification having system parameter identification information, locate data associated with the identified system parameters in a computer configuration database, produce report data, and generate an audio signal representative of the report data.

Implementations of the invention may provide one or more of the following advantages. Diagnostic data reports may be automated. Complex steps involved in the gathering of diagnostic data may be reduced or eliminated. Human error in the reporting of diagnostic data may be reduced or eliminated. Implementations may also include other advantages as will become clear from the description and claims that follow.

DESCRIPTION OF DRAWINGS

FIG. 4 depicts exemplary database tables, according to the invention.

FIG. 5 is a phonetic alphabet.

DETAILED DESCRIPTION

Figure 1:
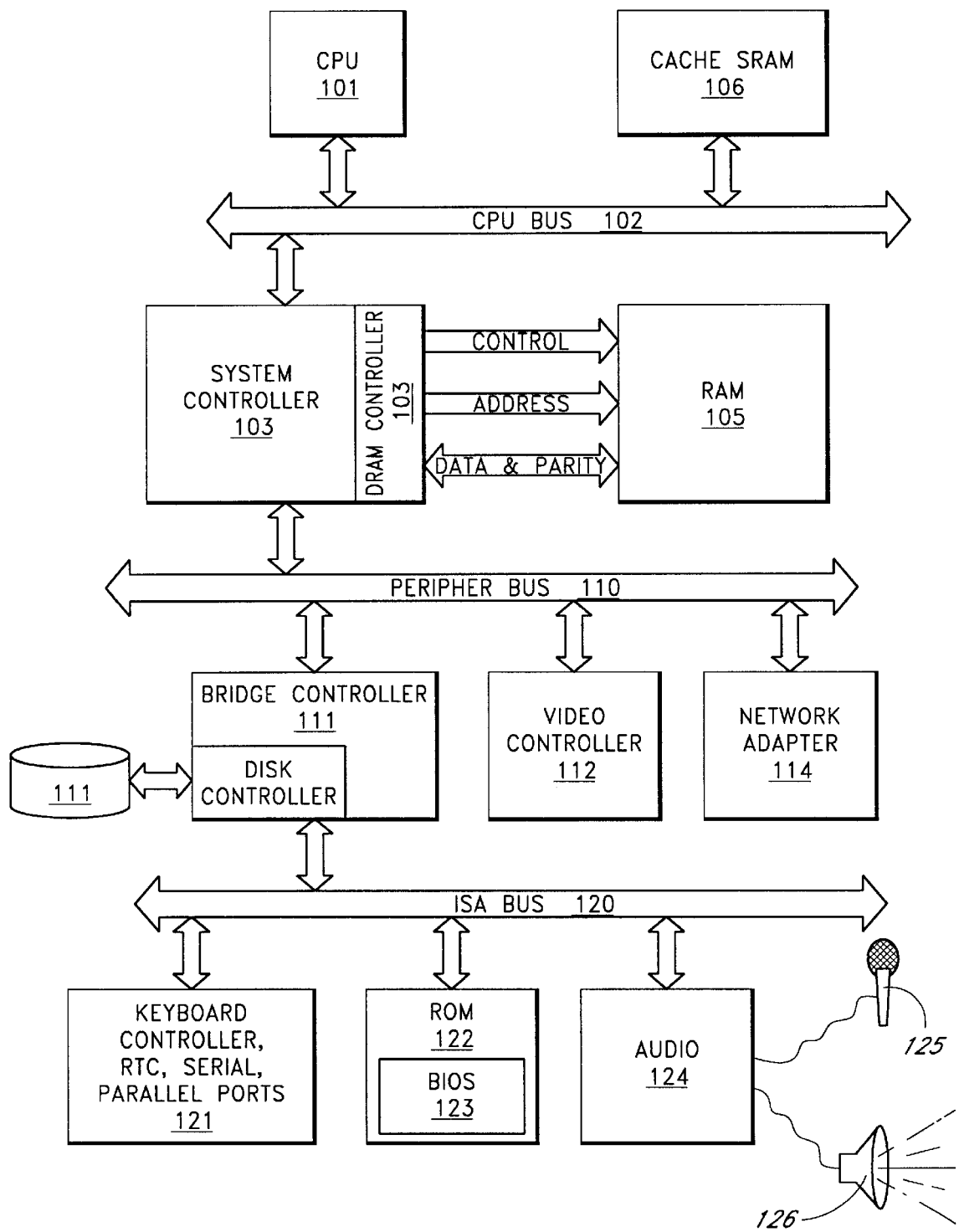
FIG. 1 is a computer system, according to the invention.

In FIG. 1 depicts physical resources of a computer system 100. The system 100 has a central processor 101 connected to a processor host bus 102 over which it provides data, address and control signals. The processors 101 may be any conventional general purpose single- or multi-chip microprocessor such as a Pentium® processor, a Pentium® Pro processor, a Pentium II® processor, a MIPS® processor, a Power PC® processor or an ALPHA® processor. In addition, the processor 101 may be any conventional special purpose microprocessor such as a digital signal processor or a graphics processor.

The microprocessor 101 has conventional address, data, and control lines coupling it to a processor host bus 102. A system controller 103 having an integrated RAM memory controller 104 is connected to the host bus 102 and provides an interface to random access memory 105. The system controller 103 also provides host bus to peripheral bus bridging functions. The controller 103 thereby permits signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 thereby allows, for example, a processor 101 having a 64-bit 66 MHz interface and a 533 Mbytes/second data transfer rate to interface to a PCI bus 110 having a data path differing in data path bit width, clock speed, or data transfer rate. Computer system accessories including, for example, a video display controller 112 and network controller 114 can be coupled to the peripheral bus 110. The network controller 114 may be, for example, a modem, an Ethernet card, or other network access means.

The system 100 may also include a secondary peripheral bus 120 coupled to the primary peripheral bus 110 through a bridge controller 111. The secondary peripheral bus 120 can be included in the system 100 to provide additional peripheral device connection points or to connect peripheral devices that are not compatible with the primary peripheral bus 110. For example, in the system 100, the secondary bus 120 may be an ISA bus and the primary bus 110 may be a PCI bus. Such a configuration allows ISA devices to be coupled to the ISA bus 120 and PCI devices to be coupled to the PCI bus 110. The bridge controller 111 can also include a hard disk drive control interface to couple a hard disk 113 to the peripheral bus 110.

The computer 100 includes non-volatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (I/O) services. For example, BIOS routines 123 may be executed by the processor 101 to process interrupts that occur when the bridge 111 attempts to transfer data from the ISA bus 120 to the host bus 102 via the bridge 111, peripheral bus 110, and system controller 103.

The BIOS 123 also includes routines that allow an operating system to be "booted" from the disk 113 or from a server computer using a local area network connection provided by the network adapter 114. The operating system boot operation can occur after the computer 100 is turned on and power-on self-test (POST) routines stored in the BIOS 123 complete execution, or when a reset switch is depressed, or following a software-initiated system reset or a software fault. During the boot process, the processor 101 executes BIOS 123 software to access the disk controller 111 or network controller 114 and thereby obtain a high-level operating system. The high-level operating system is, for example, the Microsoft Disk Operating System (DOS)™, Windows 95™, Windows NT™, a UNIX operating system, the Apple MacOS™ operating system, or other operating system. The high level operating system may be fully loaded in the RAM memory 105 or may include portions in RAM memory 105, disk drive storage 113, or storage at a network location. For example, the Microsoft Windows 95™ operating system includes some functionality that remains in memory 105 during the use of Windows 95™ and other functionality that is periodically loaded into RAM memory 105 on an as-needed basis from, for example, the disk 113.

An operating system, such as Windows 95™ or Windows NT™ provides functionality to control computer peripherals such as devices 112–114, 121, and 124, and to execute user applications. User applications may be commercially available software programs such as computer aided drawing and manufacturing software, scientific software, internet access software, word processing software, and many other types of software. User applications may access computer system peripherals 112–114, 121, and 124 through an application programming interface provided by the operating system.

Figure 2:
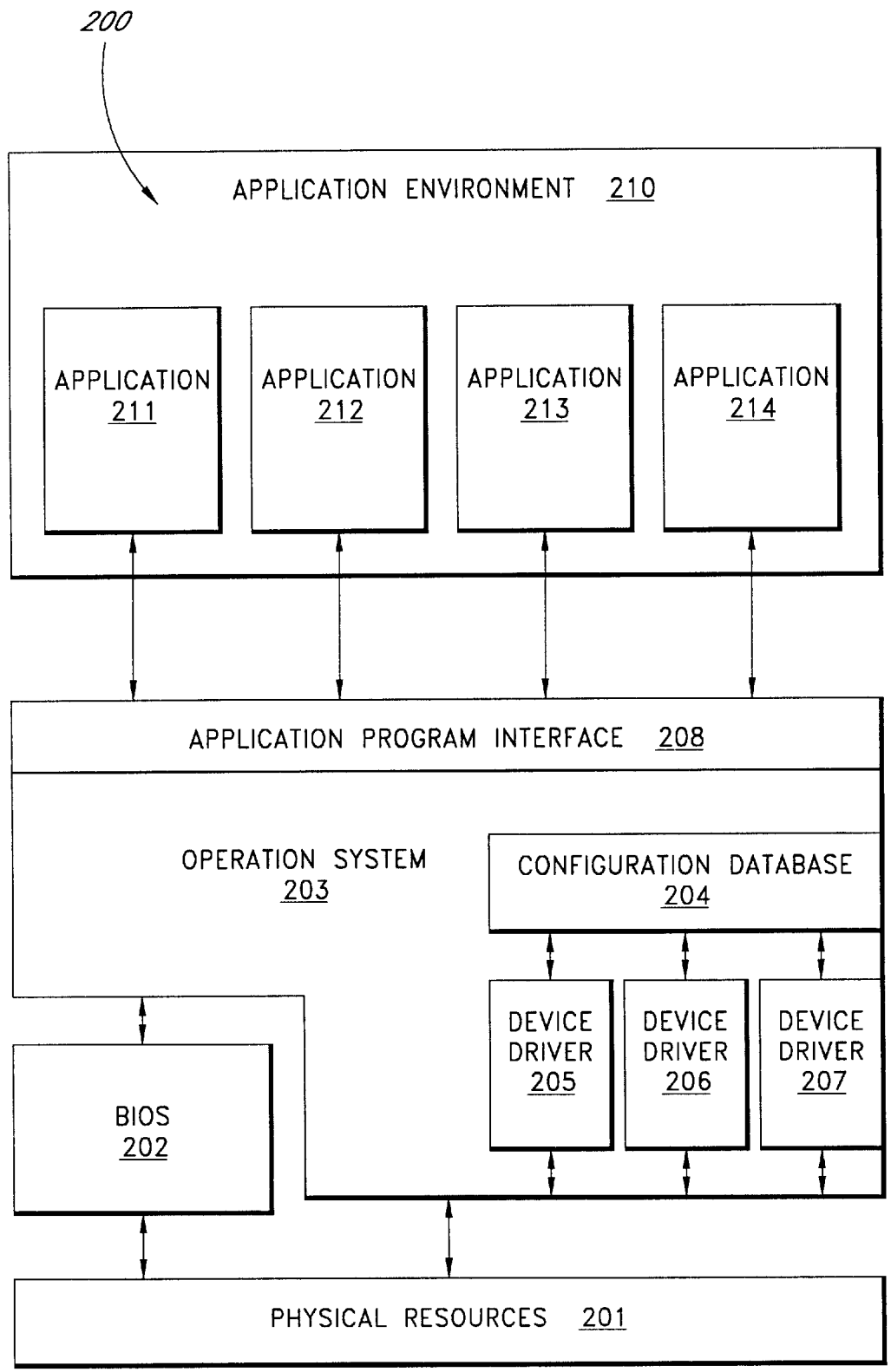
FIG. 2 depicts an exemplary computer system software architecture.

Referring to FIG. 2, a computer system operating environment 200 is shown. The environment 200 includes physical 201 and software 202, 203, and 210 resources. The physical resources 201 include, for example, components 101–105, 110–114, and 120–126 of FIG. 1. Additionally, the environment 200 includes operating system software 203. The operating system 203 is, for example, the Windows 95™ operating system or a UNIX operating system. The operating system 203 provides software functions to manages, configure, enable, and allocate the various physical resources 201 in a computer. For example, the operating system 203 may include memory allocation algorithms to allocate RAM memory 105 (FIG. 1) among various software tasks. Additionally, the environment 200 includes application program space 210. Application program space 210 includes memory and other physical resources allocated to application processes 211–214. The allocation of physical resources 201 to application processes 211–214 is, in general, managed by the operating system 203.

To manage the physical resources 201, the operating system can include one or more device drivers 205–207. The device drivers provide control functionality specific to a particular physical device or class of devices. Additionally, the device drivers 205–207 provide standard software interfaces allowing other system 200 components to access the controlled device. For example, device driver 205 may be a video device driver. The video adapter driver 205 provides standard software interfaces to, for example, the application program interface (API) 208. Applications 211–214, through use of application program interface 208 software functions, may thereby access the device driver 205 and video device 112 (FIG. 1). Device drivers 205–207 can also provide device-specific control, resource management, initialization, and fault handling for the controlled device.

An important function of an operating system 203 is to track and manage scarce resources in the computer system. Referring back to FIG. 1, in a computer system 100, various physical resources may be allocated to enable cooperation between devices 101–106, 110–114, and 120–126. For example, an industry-standard personal computer having an Intel Pentium™ processor, a PCI peripheral bus, and an ISA peripheral bus will typically use processor interrupt signals to signify when a peripheral is ready to transfer data over the PCI or ISA bus. Typically, sixteen interrupt signals are assigned among the various computer components 100 to allow approximately sixteen interrupt driven peripherals to be supported. The allocation of interrupt signals and other physical resources may be tracked by the operating system and date regarding such allocations may be stored in an operating system configuration database 204.

Physical resources tracked by operating system 203 can be manually assigned or may be assigned by the operating system 203. For example, interrupt signals assigned to devices 112, 114, 121 and 124 may be manually determined using jumper switches on the peripheral device. Alternatively, the operating system 203 may query the peripheral device to determine and assign needed resources.

In some computer systems, manually assigned system resources may need to be entered by the computer user into the operating system configuration database 204 to enable the operating system to function with the particular peripheral. If these input values are incorrectly entered, computer system faults can occur. For example, the peripheral device may be unavailable to application programs or the computer system may fail to execute programs properly.

The operating system 203 establishes an application environment 210 in which user applications 211–214 can execute. The applications 211–214 can be commercially available software programs such as a word processor, an Internet browser, a database, and various system utility tasks. In various implementations, applications 211–214 may execute independently as separate task in a multiprocessing computer system and may occupy separate memory spaces. Applications 211–214 may require particular physical resources 201 to function. For example, an Internet browser application may require access to a network adapter 114 (FIG. 1) so that a connection to the Internet network can be established. The adapter 114 may be, for example, a modem, an Ethernet card, or other network access means. Applications 211–214 can obtain access to required resources using software function calls provided through the operation system's application program interface 208.

Hardware and software resources required by the operating system and by application software may be unavailable for numerous reasons including, among others, allocation of the resource to another device or application, improper configuration of the resource, and failure or malfunction of the resource. When required resources are unavailable, particular applications and/or the entire computer system may not function properly. To diagnose and repair such system failures, a user may require the help of a diagnostic technician. Often, such assistance is provided using telephone support technicians.

To diagnose computer problems, telephone support technicians often require detailed information about computer peripheral devices, software, user-specific configuration parameters and other parameter information stored in one or more computer system configuration databases and data files 204. The system databases 204 may be stored on the computer system 100 (FIG. 1), may include data stored at a remote server accessed by the network interface 114, and may include multiple application-specific databases and data files. According to the invention, location and reporting of such diagnostic information can be provided through diagnostic software assistance.

Figure 3:
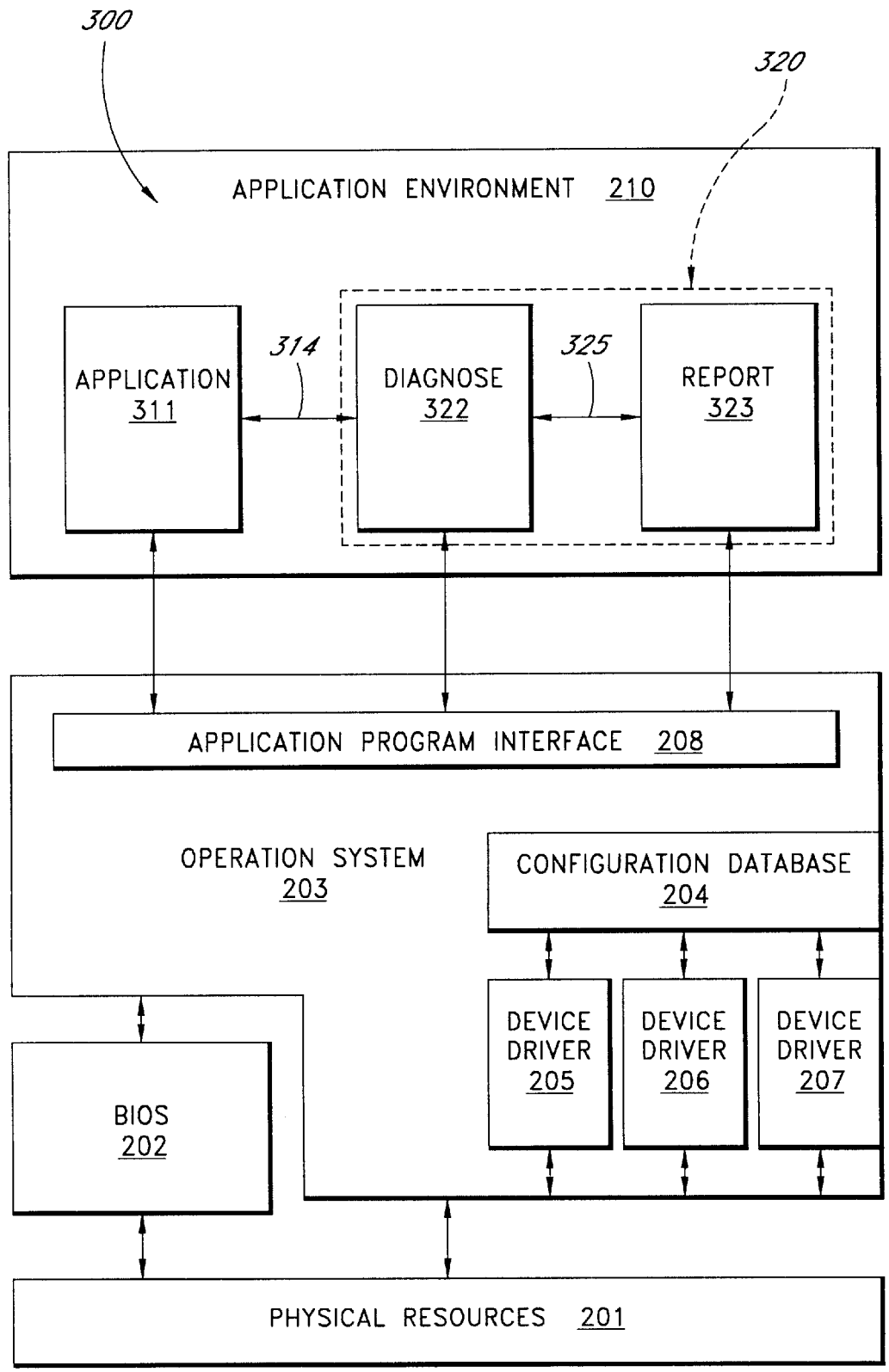
FIG. 3 depicts an exemplary computer system software architecture having diagnostic capabilities, according to the invention.

Shown in FIG. 3 is a computer system operating environment 300 having diagnostic software 320, according to the invention. The diagnostic software 320 automates the process of locating diagnostic information in computer configuration databases 204, and facilitates reporting of that information to a telephone support technician. The diagnostic system 320 includes software components 322 that collect and process diagnostics data. To collect diagnostic data, the software 322 provides a user interface to receive a diagnostic report specification. The diagnostic report specification indicates configuration database parameters to be included in a diagnostic report. The diagnostic report specification may indicate a single parameter to be reported or may indicate a comprehensive diagnostic report that includes multiple parameters. For example, graphical user interface may be used to display parameter and comprehensive report choices to a user. The user can select therefrom a collection of parameters requested by a support technician. In some implementations, the software 322 can access the operating system 203 through the program interface 208 to determine a diagnostic report specification. For example, the software 322 can query the operating system 203 to determine the last hardware or software fault that occurred. Based on the last hardware or software fault, the software 322 can determine the information that is to be included in a diagnostic report. The software 320 also includes audio report components 323 that report the diagnostics data to a support technician. The software 320 accesses audio capabilities provided by an audio input/output device 124 (FIG. 1) to report diagnostic data to a support technician.

Diagnostic software 320 can be executed by a computer user during the course of a technical support call. For example, in a computer system supporting a graphic user interface (GUI) such as a Windows 95™ computer system, a support technician may instruct the user to click on an icon representing the diagnostic software 320. Once executed, the application 320 can access the operating system configuration database 204 using application programming interface (API) 208 finction calls or, in various implementations, may bypass the API calls 208 and directly access the various system configuration databases.

When performing diagnostics, a support technician may be interested in only a subset of the configuration database 204 items. To speed data reporting, the application 320 can determine an appropriate subset of database 204 parameters based, for example, on the software application that is failing, by system hardware categories, or based on general problem descriptions. The application 320 can determine the relevant parameters using a report parameter database. Referring to FIG. 4, the report parameter database accessed by the diagnostic application 320 can include an application parameter table 410 and a hardware parameter table 420 that catalog parameters relevant to particular applications and hardware items. The tables 410 and 420 may be provided as data structures within the diagnostic program 320 or as records in an external database.

The application parameter table 410 lists database 204 items that are relevant to particular software applications. For example, in the table 410, parameters relevant to applications named "Ultra Words", "Internet Pro", and "Draw Me" are designated as well as general parameters relevant to all applications. When a software application malfunctions, the diagnostic software 320 can query table 410 to determine database 204 parameter that are relevant to that application and which should be reported to a support technician. For example, if a user was having problems with Version 4 of the "Ultra Words" application produced by "Vendor A", the diagnostic program 320 could determine that "Memory", "Disk Space", "Installation Location", "Printer Port", "Printer Type" and "Printer Resolution" parameters are of interest. Additionally, parameters may be hierarchically organized within a table and between tables. Thus, further consulting the hardware report table 420, the diagnostic program 320 would determine that the additional parameters "Interrupt" and "I/O Address" should be provided when table 410 indicates that "Printer Port" information is to be reported. In various implementations, alternate report parameter databases may be provided. Additionally, parameters to be reported may be indicated as a key to a database entry. For example, in the Windows 95™ system, application parameters may be determined using a system registry database. The system registry database can be accessed using a database key such as the key: "My Computer\HKEY_LOCAL_MACHINE\SOFTWARE" to determine installed software applications.

In systems having a "drag-and-drop" user interface, such as the MacOS™ or Windows 95™ operating system, the user may "drag-and-drop" or "point-and-click" icons to initiate diagnostic reporting. For example, a user having problems with the "Ultra Words" application from "Vendor A" can drag an icon of that application onto a window displayed by the executing diagnostic application 320. The diagnostic application 320 may then determine information about the malfunctioning application by examining application file header information and various data items stored in the application's file. Alternatively, the executing diagnostic application may provide a list of applications for which diagnostic information can be generated. A user can then choose a particular application from a list and a diagnostic report can be generated for the chosen application. Similarly, information regarding particular hardware items may be generated by selecting the hardware item of interest from a list of choices or by dragging and dropping an icon representative of the hardware item. Alternate methods of selecting particular diagnostic information to be reported may also be provided. For example, a user may explicitly choose parameters to be reported from a list of parameters or may enter codes describing the parameters to be reported.

Once the appropriate list of diagnostic parameters has been determined, report functionality 323 is used to provide the information to a support technician. To facilitate telephone support service, the report functionality 323 transmits the diagnostic data as voice-bandwidth sounds that can be sent on an analog plain old telephone service (POTS) phone connection. Typically, such signals are in the frequency range of 0 to 4 KHz and may be transmitted over the POTS connection by holding a telephone handset near a audio device output speaker or by directly coupling the audio signal to the analog telephone device. In a text-to-speech implementation, report application 322 uses text-to-speech software to produce voice- bandwidth speech signals that send the diagnostic data to a support technician. Such text-to-speech capabilities may be provided using known text to speech conversion software such as the Monologue™ software from First Byte®.

Text-to-speech reporting capabilities may provide poor pronunciation of certain database parameters. This can be particularly problematic where the data item being reported is not a word or number within the text-to-speech converter's vocabulary. For example, binary digits, hexadecimal digits, and character strings may be poorly pronounced. To ensure that such data is comprehended by the support technician, it may be necessary to convert it to a clearly pronounced form.

To clarify reported data, various techniques can be used. In the case of character strings, the report functionality 323 can use a phonetic alphabet to convert the strings to clearly pronounced words. Referring to FIG. 5, one possible phonetic alphabet is shown. Using the alphabet 500, the string value "AFADBC" could be translated as the series of words "Alpha Foxtrot Alpha Delta Bravo Charlie." This phonetic translation helps to ensure clear transfer of the information to a support technician. To report data items such as binary strings and hexadecimal digits, the report functionality 323 can include additional data conversion mechanisms. In the case of binary data, the data can be converted to hexadecimal digits and pronounced as the numbers '0' through '9' and the letters 'A' through 'F'. Alternately, data may be represented using clearly defined tones or sounds. In one implementation, the information being reported may be converted to Dual-Tone Multi-Frequency (DTMF) information. The DTMF coded information could be transmitted across the phone network to a remote diagnostic center where DTMF receiving equipment coupled to the receiving phone and to the technician's computer can de-modulate the data and converted it into readable digital data.

Various other parameter types may need to be preprocessed by the reporting function 323 prior to sending the information across the telephone network. Referring back to FIG. 4, a database table, such as table 410 may also indicate a data type associated with each parameter. For example, the "Memory" parameter is of the type "Integer." This can be used by the reporting routine 323 to determine how the data type is to be pronounced. For example, the routine 323 may apply different text-to-speech algorithms when reporting a parameter that is of an "Integer" type than is used when reporting a "String" parameter.

Implementations of the invention may include additional diagnostic parameter tables to identify and categorize additional data items. Furthermore, a computer system according to the invention may include additional components, fewer components, or may integrate one or more components of the system 100 (FIG. 1).

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Still other embodiments are within the scope of the following claims.

What is claimed is:

1. A method of reporting computer system information, the method comprising:

identifying a computer that last failed;

determining at least one computer system parameter based on the identified computer component;

locating data associated with the computer system parameter by searching a computer configuration database; and producing report information comprising the data located by searching the computer configuration database.

2. The method of claim 1 further comprising:

providing a graphical user interface to display report information; and receiving at the user interface a report signal indicative of computer system parameter identification information.

3. The method of claim 1 further comprising:
querying an operating system for fault information;
receiving from the operating system a query response indicating a detected fault; and
determining parameter identification information based on the received query response.

4. The method of claim 1 wherein searching a computer configuration database comprises searching application program and operating system configuration files.

5. The method of claim 1 further comprising generating an audio signal that comprises generating a plain old telephone service voice-bandwidth signal.

6. The method of claim 5 wherein generating a voice-bandwidth signal comprises conversion of report data to speech using a text-to-speech converter.

7. The method of claim 1 further comprising altering report data by substitution using a phonetic alphabet representation, and wherein generating an audio signal representative of the report data comprises generating an audio signal representative of the altered report data.

8. The method of claim 7 wherein altering comprises conversion of report data to dual tone multi-frequency tones.

9. The method of claim 1, wherein identifying a computer component that last failed includes querying the operating system to determine the last hardware or software fault that occurred.

10. The method of claim 9, wherein determining at least one computer system parameter includes determining a subset of database parameters based on the hardware or software fault.

11. The method of claim 1, further comprising running a diagnostic software that automates the step of locating data associated with the computer system parameter.

12. The method of claim 1, further comprising running a diagnostic software that determines a subset of database parameters based on at least one of the identity of the component that last failed, system hardware categories, and problem description.

13. A computer system comprising:
a system configuration database;
a processor;
a bus operationally coupling the processor to the system configuration database, wherein the processor comprises:
a module that identifies a computer component that last failed;
diagnostic means for determining a report parameter, and
means for locating data associated with the determined report parameter in the system configuration database.

14. The system of claim 13 further comprising an operating system program, the operating system program comprising instructions for causing the processor to allocate computer system physical resources and to store and retrieve resource allocation information in the system configuration database.

15. The system of claim 13 wherein the system comprises multiple configurable hardware components and the configuration database comprises configuration data associated with the multiple configurable hardware components.

16. A computer system comprising:
a computer program on a first storage media;
a system configuration database residing on a second storage media; and
a processor operationally coupled to the first storage media and to the second storage media to send and receive data between the processor and said storage media; and wherein the computer program comprises instructions for causing the computer to perform the acts of:
determining a computer system parameter for a computer component that last failed,
locating data associated with the computer system parameter by searching a computer configuration database, and
producing report information, the report information comprising the data located by searching the computer configuration database.

17. The system of claim 16 wherein at least one of the first and second storage media comprises a hard disk drive; and wherein the processor is operationally connected to an audio output device to send audio output signals to the audio output device.

18. The system of claim 17 wherein the bus comprises:
an industry standard architecture (ISA) bus;
a peripheral component interconnect (PCI) bus;
a bridge device interconnecting the industry standard architecture bus and the peripheral component interconnect bus;
a processor host bus;
a system controller device coupling the processor host bus to and the peripheral component interconnect bus; and wherein
the processor is coupled to the processor host bus; and
the audio output device is coupled to the industry standard architecture bus.

19. A computer program residing on a computer-readable medium, the program comprising instructions for causing a computer to perform the acts of:
determining a computer system parameter for a computer component that last failed,
locating data associated with the computer system parameter identification information by searching a computer configuration database; and
producing report information, the report information comprising the data located by searching the computer configuration database.

* * * * *